US011360204B2

(12) United States Patent
Hakobyan et al.

(10) Patent No.: US 11,360,204 B2
(45) Date of Patent: Jun. 14, 2022

(54) AMBIGUITY RESOLUTION FOR A MIMO RADAR SYSTEM

(71) Applicant: Robert Bosch GmbH, Stuttgart (DE)

(72) Inventors: Gor Hakobyan, Stuttgart (DE); Markus Gonser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 16/704,130

(22) Filed: Dec. 5, 2019

(65) Prior Publication Data

US 2020/0182991 A1 Jun. 11, 2020

(30) Foreign Application Priority Data

Dec. 6, 2018 (DE) .......................... 102018221085.3

(51) Int. Cl.
*G01S 13/58* (2006.01)
*H04B 7/0413* (2017.01)

(52) U.S. Cl.
CPC .......... *G01S 13/582* (2013.01); *H04B 7/0413* (2013.01)

(58) Field of Classification Search
CPC ...... G01S 13/582; G01S 13/343; G01S 13/42; G01S 7/415; G01S 13/284; G01S 13/584; G01S 2013/0245; G01S 13/288; G01S 7/411; H04B 7/0413
See application file for complete search history.

(56) References Cited

U.S. PATENT DOCUMENTS

| 2017/0160380 A1* | 6/2017 | Searcy | G01S 7/2921 |
| 2018/0203105 A1* | 7/2018 | Kuehnle | G01S 13/343 |
| 2018/0356498 A1* | 12/2018 | Stachnik | G01S 13/42 |
| 2020/0049811 A1* | 2/2020 | Bialer | G01S 13/931 |
| 2020/0088867 A1* | 3/2020 | Rajendran | G01S 13/60 |
| 2021/0278522 A1* | 9/2021 | Kitamura | G01S 13/584 |
| 2021/0302560 A1* | 9/2021 | Kishigami | G01S 7/352 |

FOREIGN PATENT DOCUMENTS

| CN | 108594233 A | * | 9/2018 | ............. G01S 13/92 |
| DE | 102014212284 A1 | * | 12/2015 | ........ G01S 13/0209 |
| DE | 102014212284 A1 | | 12/2015 | |
| WO | 2018/076005 A1 | | 4/2018 | |
| WO | WO-2018076005 A1 | * | 4/2018 | ............. G01S 13/42 |

* cited by examiner

*Primary Examiner* — Erin F Heard
*Assistant Examiner* — Juliana Cross
(74) *Attorney, Agent, or Firm* — Norton Rose Fulbright US LLP; Gerard Messina

(57) ABSTRACT

A method for a MIMO radar system includes encoding signals that are transmitted from different transmitting antennas according to code blocks; determining for a radar object a Doppler estimation that has a periodic ambiguity; and resolving the periodic ambiguity, where the resolving includes, for each of multiple ambiguity hypotheses of the Doppler shift: compensating for the Doppler shift according to the respective ambiguity hypothesis, and decoding for separating signal components associated with the transmitting antennas. An ambiguity hypothesis that is applicable to the radar object is selected based on quality criteria for the decoding for the particular ambiguity hypotheses, and an unambiguous speed estimation of the radar object is determined corresponding to the Doppler estimation and the selected ambiguity hypothesis. The quality of an angle estimation based on the signal components can be determined as a quality criterion for the decoding.

10 Claims, 6 Drawing Sheets

AMBIGUITY RESOLUTION FOR A MIMO RADAR SYSTEM

CROSS-REFERENCE TO RELATED APPLICATIONS

The present application claims priority under 35 U.S.C. § 119 to DE 10 2018 221 085.3 filed in the Federal Republic of Germany on Dec. 6, 2018, the content of which is hereby incorporated by reference herein in its entirety.

FIELD OF THE INVENTION

The present invention relates to a method for operating a Multiple Input-Multiple Output (MIMO) radar system that includes multiple antennas. Moreover, the present invention relates to a MIMO radar system for estimating the speed of detected radar objects.

BACKGROUND

Radar systems are being increasingly used in motor vehicles for detecting the traffic surroundings, and they supply information concerning distances, relative speeds, and direction angles of located objects, such as vehicles or obstructions, to one or multiple safety or comfort function(s) that relieve the driver in driving the motor vehicle or completely or partially replace the human driver. MIMO systems in which multiple transmitting and receiving antennas are employed are finding increasing use.

WO 2018/076005 A1 mentions various types of MIMO radar systems, in which transmitters and/or receivers can be situated at different positions. Virtual channels can be generated by use of mutually orthogonal codes. A time division multiple access (TDMA) method or a frequency division multiple access (FDMA) method can be used.

A MIMO radar measuring method is known from DE 10 2014 212 284 A1, in which a transmitted signal is ramp-shaped frequency-modulated using a modulation pattern in which sequences of ramps are associated with different transmission switching states which differ in the selection of the antenna elements used for the transmission, and are temporally nested. In turn, multiple temporally nested sequences are associated with a transmission switching state. Based on a peak position in a two-dimensional spectrum of a signal that is obtained for a sequence, values of a relative speed of a radar target are determined which are periodic with a predetermined speed period. Phase relationships of spectral values in the spectra for the sequences of a transmission switching state are compared to phase relationships that are expected for particular periodic values of the relative speed, and an estimated value of the relative speed is selected based on the comparison result.

US 2017/0160380 A1 describes a MIMO radar system in which multiple transmitting antennas transmit simultaneously. Using pseudo-random phase modulation (PRPM), the phase of a signal that is led to a particular transmitting antenna is randomly varied in order to achieve a degree of orthogonality between the simultaneously emitted and received signals.

Digital modulation methods with multiple carrier frequencies are known as orthogonal frequency division multiplex (OFDM) methods. Use of OFDM methods for radar systems is being increasingly investigated. In an OFDM method, the frequency band is divided into multiple orthogonal subbands or subcarriers (frequency division multiplexing (FDM)), and OFDM symbols are sequentially transmitted. The transmitted signal of an OFDM symbol is made up of mutually orthogonal subcarrier signals that are modulated according to a modulation scheme of the symbol and which are simultaneously transmitted within the OFDM symbol period.

SUMMARY

An object of the present invention is to allow a relative speed of radar objects to be determined during a MIMO measurement, within a short measuring time and with high accuracy and a large uniqueness range. For a MIMO measurement, it is particularly desirable to determine the distance, relative speed, and a direction angle of radar objects within a short measuring time and with high accuracy and a large uniqueness range.

This object is achieved, according to an example embodiment of the present invention, by a method for operating a MIMO radar system that includes multiple antennas, the method including the steps: encoding signals that are transmitted from different transmitting antennas, according to code blocks, a code block including different codes for encoding transmitted signals of different antennas, and each code including a sequence of code values according to which the phase and/or amplitude of a sequence of signals of the particular transmitting antenna are/is modulated; determining a Doppler estimation for a radar object based on phase changes between received signals at the same position in successive code blocks, the Doppler estimation for the radar object having a periodic ambiguity corresponding to multiple ambiguity hypotheses of a Doppler shift of the signals; and resolving the periodic ambiguity of the Doppler estimation for the radar object. The resolving includes, for each of multiple ambiguity hypotheses of the Doppler shift: compensating for the Doppler shift of the phases of the signals belonging to a code block according to the respective ambiguity hypothesis, decoding the Doppler shift-compensated signals of the code block for separating signal components associated with the transmitting antennas, and determining a quality criterion of the decoding. The resolving further includes selecting an ambiguity hypothesis that is applicable to the radar object based on the determined quality criteria for the particular ambiguity hypotheses, and determining an unambiguous speed estimation of the radar object corresponding to the Doppler estimation and the selected ambiguity hypothesis.

The object, to determine during a MIMO measurement in particular a relative speed of a radar object within a short measuring time and with high accuracy and a large uniqueness range, is achieved by the present invention essentially in that an encoding of the transmission signals of different transmitting antennas takes place, and for multiple ambiguity hypotheses of the Doppler shift, a Doppler compensation and subsequent decoding take place, using a quality criterion for the decoding for selecting the applicable ambiguity hypothesis. For a non-applicable ambiguity hypothesis, the Doppler compensations based thereon are not adapted to the actual speed of the radar object and the actual Doppler shift, so that the decoding is disturbed; a signal component associated with a transmitting antenna then contains signal components of the other transmitting antennas.

It is advantageous that a MIMO measurement with multiple transmitting antennas is made possible in which for the individual transmitting antennas, the unambiguously measurable distance and speed ranges as well as respective distances and speeds remain unchanged, even when multiple transmitting antennas are used at the same time.

For multiple radar objects, in each case multiple ambiguity hypotheses are established and the steps based thereon are carried out.

In an example embodiment, a phase modulation, or a phase modulation and an amplitude modulation, of the sequence of signals of the particular transmitting antenna take(s) place.

The encoding preferably encompasses an encoding of signals that are simultaneously transmitted from different transmitting antennas, according to the code blocks, a code block including different codes for encoding simultaneously transmitted signals of different antennas, and each code including a sequence of code values according to which the phase and/or amplitude of a sequence of signals of the particular transmitting antenna are/is modulated. Thus, in each code instance (i.e., at each position within the code), the transmitting antennas simultaneously transmit their respective encoded signal, and are thus simultaneously active in each code instance.

In another example embodiment, the modulation of the amplitude of the sequence of signals can include a sampling of the sequence of signals of the particular transmitting antenna according to the sequence of the code values, in particular a multiplication of a signal using zero for a code value in question.

According to an example embodiment, the object is achieved by a method for operating a MIMO radar system that includes multiple antennas, including the steps of: encoding signals that are transmitted from different transmitting antennas, according to code blocks, a code block including different codes for encoding transmitted signals of different antennas, and each code including a sequence of code values according to which the phase and/or amplitude of sequence of signals of the particular transmitting antenna are/is modulated; determining a Doppler estimation for a radar object based on phase changes between received signals at the same position in successive code blocks, the Doppler estimation for the radar object having a periodic ambiguity corresponding to multiple ambiguity hypotheses of a Doppler shift of the signals; and resolving the periodic ambiguity of the Doppler estimation for the radar object. The resolving includes, for each of multiple ambiguity hypotheses of the Doppler shift: compensating for the Doppler shift of the phases of the signals belonging to a code block according to the respective ambiguity hypothesis, decoding the Doppler shift-compensated signals of the code block for separating signal components associated with the transmitting antennas, and determining an angle estimation for the radar object based on the signal components and their association with the transmitting antennas. The resolving also includes selecting an ambiguity hypothesis that is applicable to the radar object and the corresponding angle estimation based on the quality of the angle estimations, and determining an unambiguous speed estimation of the radar object corresponding to the Doppler estimation and the selected ambiguity hypothesis.

The quality of the angle estimation is thus used as a quality criterion for the decoding, and the angle estimation for the selected ambiguity hypothesis is determined as the applicable angle estimation for the radar object. Thus, an encoding of the transmission signals of different transmitting antennas takes place, and, for multiple ambiguity hypotheses of the Doppler shift, a Doppler compensation and subsequent decoding and angle evaluation take place, the quality of the angle evaluation results being used for selecting the applicable ambiguity hypothesis. In particular, for multiple ambiguity hypotheses of the Doppler shift a Doppler compensation and subsequent decoding and angle evaluation can take place, the quality of the angle evaluation results being used for selecting the applicable ambiguity hypothesis.

Use is thus made of the effect that the decoding is susceptible to Doppler shifts, in order to simultaneously find the correct hypothesis of the ambiguity of the Doppler shift, and also to determine the applicable result of the angular resolution after decoding.

The sequence of signals whose phase and/or amplitude are/is modulated can also be referred to as a sequence of waveforms whose phase and/or amplitude are/is modulated according to the sequence of code values. The individual signal or the waveform can be, for example, an FMCW signal in the form of a frequency ramp, in particular a fast chirp, or an OFDM symbol.

The signals that are (preferably simultaneously) transmitted from different antennas are encoded according to code blocks. In the step of encoding, an individual signal of a transmitting antenna is phase-modulated and/or amplitude-modulated according to a code value, the code value being associated with the signal via its position in the sequence of the code values. The sequence of code values of a code and the sequence of signals of the particular antenna in particular have the same length, i.e., contain the same number of elements.

Based on the distance from a radar object, a signal that is delayed by the propagation time to the radar object and back is received at a particular antenna that is used for the reception. For simultaneously transmitted signals, the sum of the reflected, simultaneously transmitted signals of the particular transmitting antennas is received at a particular antenna. For an FMCW radar system, the propagation time is apparent due to a frequency shift with respect to the instantaneously transmitted frequency of a signal, and can be detected using a Fourier transform. A distance estimation can thus take place in the conventional manner.

An encoding of the signals, in which the signals of the different transmitting antennas are phase-shifted relative to one another due to the codes used, has an effect similar to multiple simultaneously transmitted signals for virtual beam-forming with phase delay. The beams of the transmitting antennas can have pseudo-random directional characteristics, depending on the code matrix (code block). The different phases of the signals of the particular transmitting antennas have no effect on the propagation time. A distance estimation can thus take place based on the received signals which have not yet been decoded.

Due to the Doppler effect, a radial relative speed of the radar object results in a frequency shift of the received signals. In addition, the ambiguous Doppler estimation can take place based on the received signals which have not yet been decoded. For an FMCW radar system, in which the signal has multiple fast frequency ramps within a code block whose phase and/or amplitude are/is modulated, and the signal is repeated for successive code blocks, for example a detection of radar objects can take place in a two-dimensional spectrum of the received signals. A Fourier transform takes place in a first dimension within a signal, and in a second dimension takes place from code block to code block, i.e., for the same position of a signal in successive code blocks. The uniqueness range of speed v has a width $v_u$ of:

$$v_u = c/(2f_0 T_{C2C}),$$

where c is the speed of light, $f_0$ is the carrier frequency or center frequency of the ramps, and $T_{C2C}$ is the time period from code block to code block.

If no Doppler shift is present due to the fact that the radar object has no relative speed in the radial direction, a decoding of the signals of a code block can be easily carried out in order to separate the signal components that originate from the different transmitting antennas. The separated signal components can then be used for an angle estimation in a manner known per se. For example, the pattern of the signal components is compared to patterns that are expected for particular angles in order to estimate the angle based on the degree of concordance.

However, if a Doppler shift is present, it has the effect of a phase shift of the received signal, depending on the position of the signal relative to the first transmitted signal of a code block. Without a compensation for the Doppler shift of the phases, the separation of the signal components using decoding would be disturbed; a signal component associated with a transmitting antenna would then contain signal components of the other transmitting antennas.

Conventional methods that include encoding of simultaneously transmitted signals are adversely affected by this effect of the Doppler shift.

However, the present invention makes use of this effect. For this purpose, the ambiguity of the Doppler estimation is generated in a targeted manner, and for particular hypotheses of the Doppler shift an assumed Doppler shift of the signals is compensated for before the signals are decoded. For a non-applicable hypothesis of the Doppler shift, the compensation for the Doppler shift thus fails, and the decoding results in incorrectly or incompletely separated signal components of the transmitting antennas.

Due to the fact that the signal components are preferably used as the basis for an angle estimation, the angle estimation takes place with only low quality. In contrast, for the applicable hypothesis of the Doppler shift, the Doppler shift is suitably compensated for, the decoding obtains the correctly compensated signals, and the angle estimation can be carried out with high quality. The quality of the angle estimation is thus utilized to recognize the correct ambiguity hypothesis. Thus, the ambiguity of the Doppler estimation, and thus of the speed estimation, can be resolved, and also the applicable angle estimation can be recognized, in one step.

The method preferably also includes the step: determining a distance estimation for the radar object based on an evaluation of a propagation time of a received signal. Determining the distance estimation particularly preferably takes place based on the signals, prior to the step of decoding. The distance estimation can easily take place in addition to the Doppler estimation when, for the separation of radar objects, a separation, i.e., a detection as separate radar objects, is carried out based on different (peak) signal positions in a distance-speed spectrum.

Determining a distance estimation for a radar object thus takes place based on an evaluation of a propagation time of a received signal. The individual signal of the sequence of signals of a code block is selected in such a way that the bandwidth of the signal allows the distance estimation. For example, in the case of an FMCW radar system, the individual signal can be a fast ramp of a ramp-shaped frequency modulation of the transmission signal. This corresponds to a chirp sequence method in which, however, in the present case a sequence of successive code blocks is provided for which the individual code block in turn contains a sequence of chirps (fast ramps). However, an OFDM symbol can also be used as an individual signal of the sequence of signals of a transmitting antenna. The modulation of the phases and/or amplitudes of the sequence of OFDM symbols then takes place within a code block. This means that OFDM symbols, whose phase and/or amplitude are/is modulated, are sequentially transmitted.

Identical signals, which are phase-modulated and/or amplitude-modulated with the different sequences of code values, are preferably simultaneously used for the different antennas.

A sequence of signals is preferably used for an antenna, the signals having the same carrier frequency. As a result, for different positions within a code block there are no different dependencies of the phases of the signals on the distance of the radar object. For FMCW ramps, for example the same ramp center frequency is used. For OFDM symbols, the same (main) carrier frequency is used.

For an antenna, a sequence of identical signals is preferably used, the signals being phase-modulated and/or amplitude-modulated with the code values of the particular sequence of code values.

The decoding of the Doppler shift-compensated signals of the code block preferably takes place by multiplying a vector of the complex signal amplitudes by a decoding matrix to obtain a vector of the signal components associated with the antennas.

For example, orthogonal codes or pseudo-noise sequences can be used as codes in a code block. Codes for binary phase encoding using code values from the set of phase rotations by 0° and by 180° are particularly efficient to implement in terms of circuitry. In an example embodiment, codes can be provided in which in each code instance, only one of the transmitting antennas is active, in that for the remaining transmitting antennas a code value is provided that corresponds to a suppression of the signal via a modulation with an amplitude equal to zero, different transmitting antennas being active in different code instances. The decoding then corresponds to an association of the received and Doppler-compensated signals with the particular transmitting antennas corresponding to the transmission sequence that is defined by the code block.

Moreover, the object is achieved by a MIMO radar system preferably configured for carrying out the described method. The MIMO radar system is preferably a MIMO radar system for estimating the speed and angle of detected radar objects, and the control and evaluation device is configured in such a way that during the resolution of the periodic ambiguity of the Doppler estimation for the radar object for multiple ambiguity hypotheses of the Doppler shift, in each case a determination of an angle estimation for the radar object takes place based on the signal components and their association with the transmitting antennas, the resolution of the periodic ambiguity of the Doppler estimation for the radar object further encompassing: selecting an ambiguity hypothesis that is applicable to the radar object, and the corresponding angle estimation, based on the quality of the angle estimations. The quality of the angle estimation is thus determined as a quality criterion for the decoding.

The control and evaluation device is preferably further configured for determining a distance estimation for a radar object, based on an evaluation of a propagation time of a received signal.

For the estimation of a distance based on an evaluation of a propagation time, a signal is preferably used which is not a continuous wave (CW) signal having a single fixed frequency. Rather, the signal should have a certain bandwidth greater than zero, since the bandwidth is essential for the distance resolution. In the step of encoding, an individual signal of a transmitting antenna, which is phase-modulated and/or amplitude-modulated according to the particular code value, preferably has a bandwidth that limits or in particular determines a distance resolution of the distance estimation (i.e., the smallest resolvable distance) in the step of determining the distance estimation. For the step of determining a distance estimation, bandwidth B can, for example, limit or define a distance resolution Δd corresponding to the relationship $$\Delta d = c/(2B),$$

where c is the speed of light. In the case of a signal in the form of an FMCW frequency ramp, such as a fast chirp, bandwidth B corresponds to the frequency deviation of the ramp.

In an example embodiment, in the step of encoding, an individual signal of a transmitting antenna is a signal which is frequency-modulated in the form of a ramp, and which is phase-modulated and/or amplitude-modulated according to the code value, the code value being associated with the signal based on its position in the sequence of the code values. This means that each code of a code block includes a sequence of code values according to which the phase and/or amplitude of a sequence of signals of the particular antenna are/is modulated, the signals being frequency ramps. The frequency ramps are also referred to as chirps.

In an example embodiment, in the step of encoding, an individual signal of a transmitting antenna is an OFDM symbol that is phase-modulated and/or amplitude-modulated according to the code value, the code value being associated with the signal based on its position in the sequence of the code values. This means that each code of a code block includes a sequence of code values according to which the phase and/or amplitude of a sequence of signals of the particular antenna are/is modulated, the signals being OFDM symbols. The OFDM symbol is made up of mutually orthogonal subcarrier signals which are modulated according to a modulation scheme of the symbol and which are simultaneously transmitted within the period of the OFDM symbol.

The number of code instances, i.e., the length of a code, is preferably greater than or equal to the number of transmitting antennas that transmit in a code block. With the same number, the signal components of the transmitting antennas can be unambiguously separated on the reception side by decoding. For a longer code length, an overdetermined equation system can be implemented. This can contribute to the robustness of the ambiguity resolution.

Example embodiments are explained in greater detail below based on the drawings.

DETAILED DESCRIPTION

Figure 1:
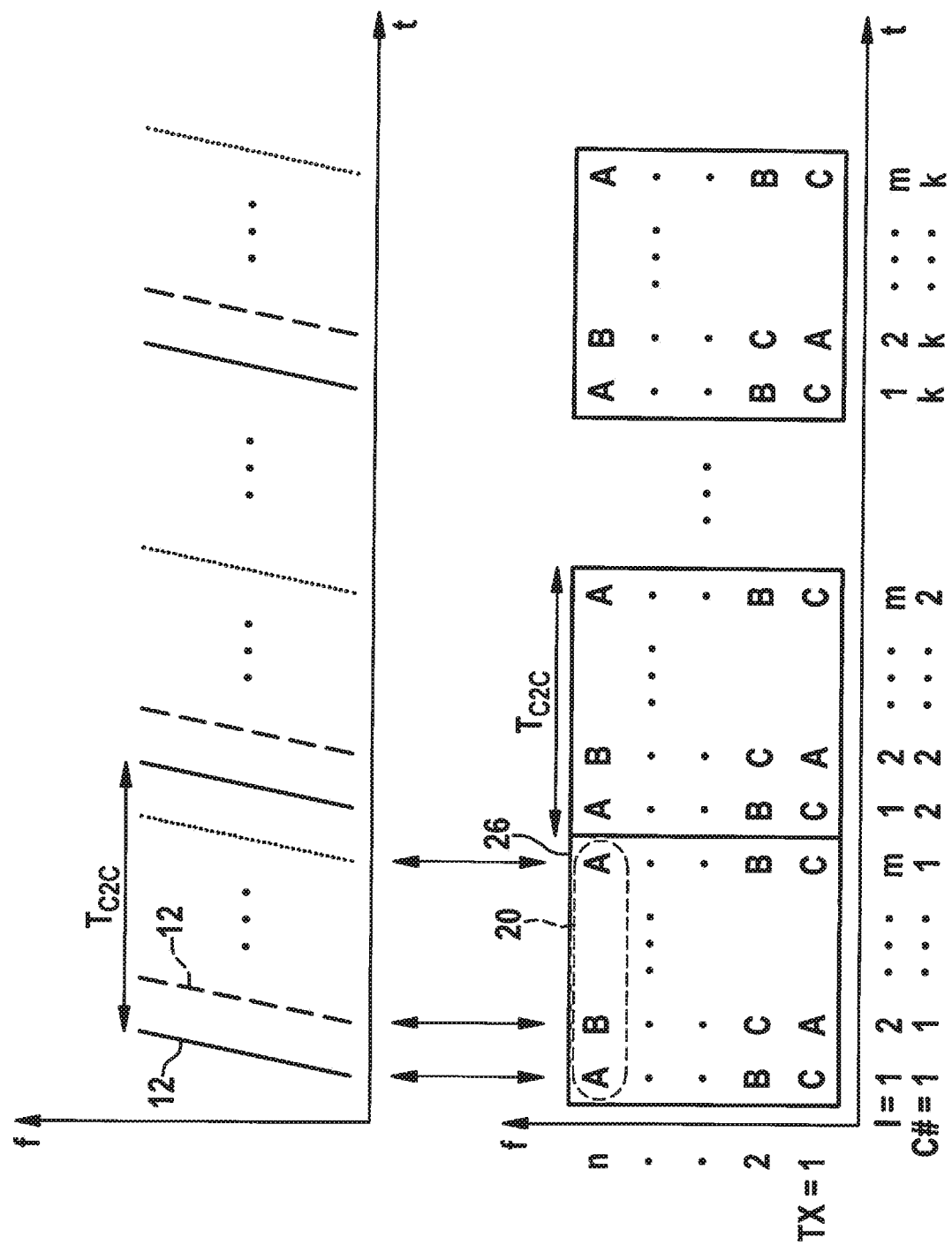
FIG. 1 shows diagrams of the frequency of FMCW transmission signals and a modulation scheme of the transmission signals, according to an example embodiment of the present invention.
Figure 2:
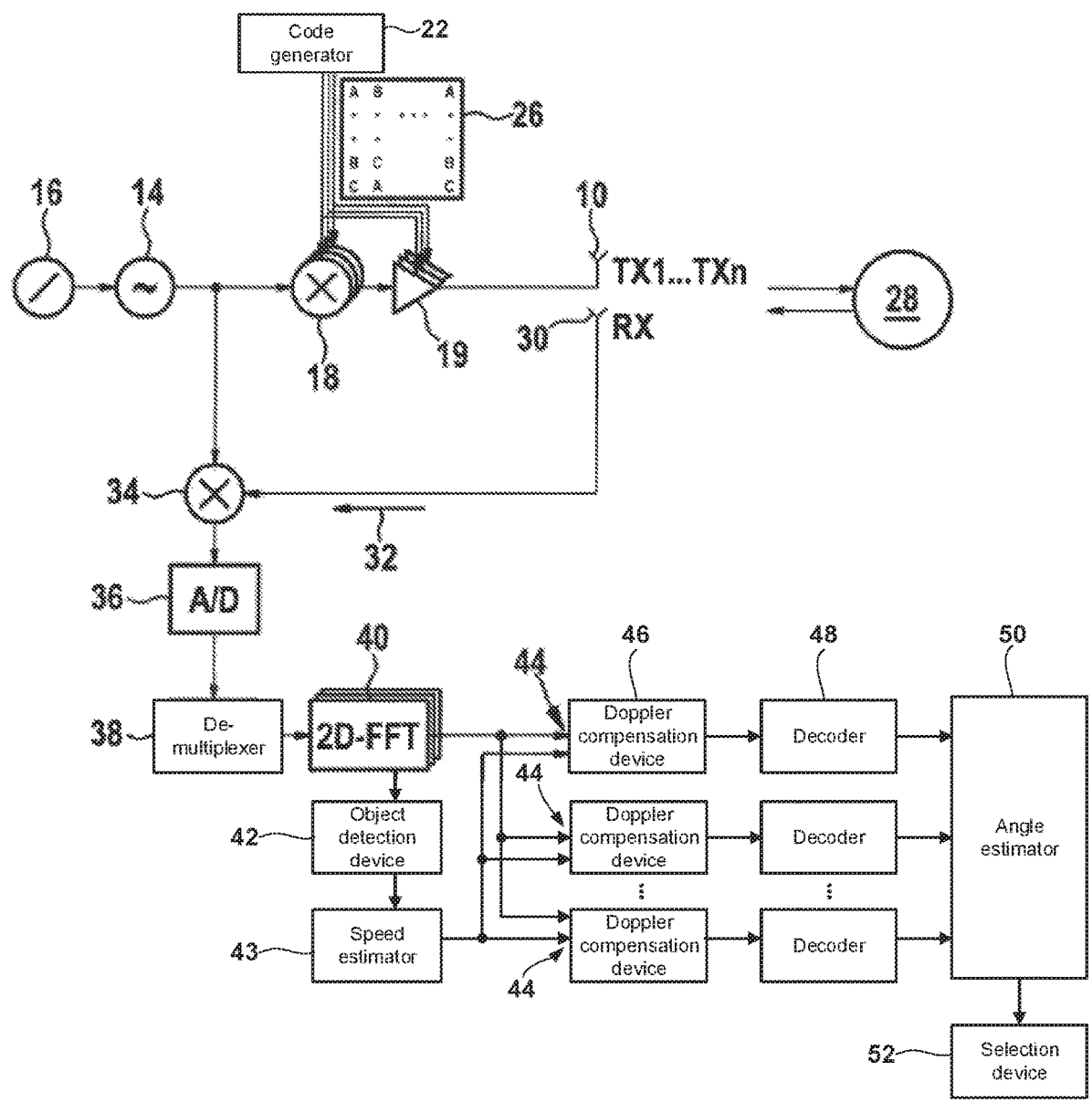
FIG. 2 shows a schematic illustration of a MIMO radar system with independent determinations of distance and speed, according to an example embodiment of the present invention.
Figure 3:
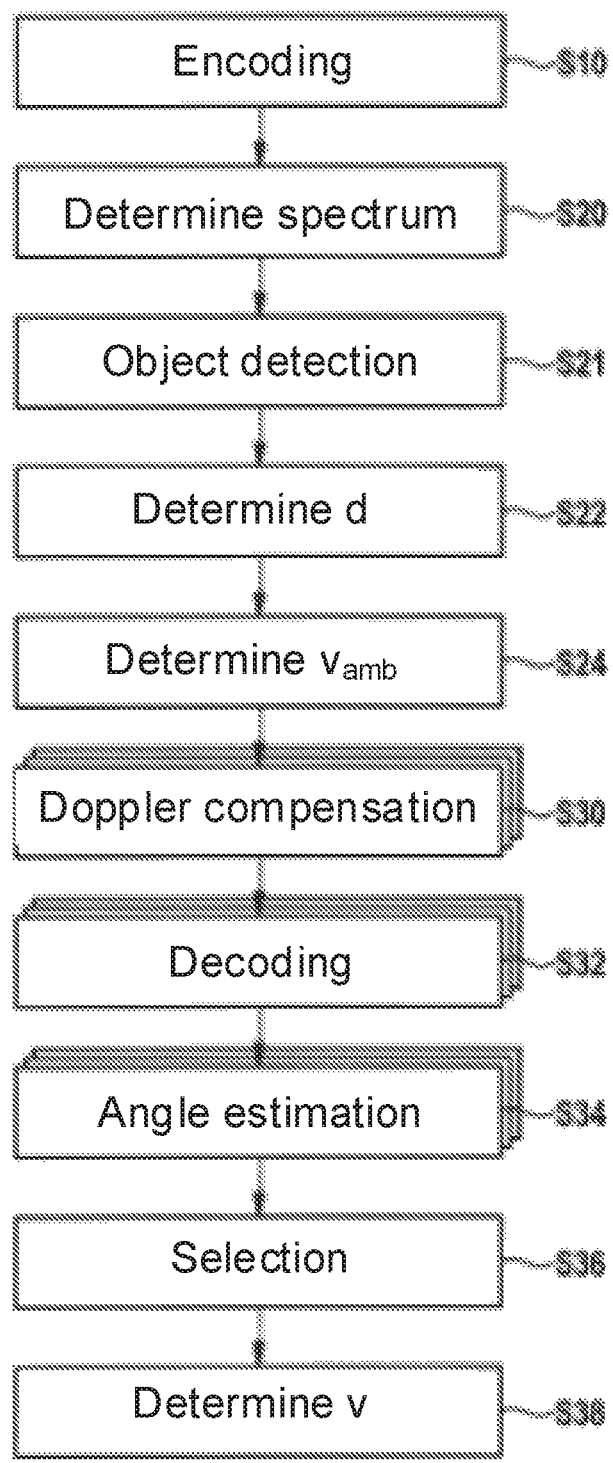
FIG. 3 shows a schematic illustration of an operating process of the radar system, according to an example embodiment of the present invention.

Based on FIGS. 1-3, an example embodiment of a fast chirp MIMO radar system is explained as an example of an FMCW MIMO radar system in which an encoding of transmission signals takes place using phase modulation. FIG. 1 schematically illustrates the frequency pattern of transmitted signals, and below same, a scheme of code blocks with which the transmitted signals are phase-modulated. FIG. 2 schematically shows the design of the radar system and its control and evaluation device; for simplification of the illustration, only one receive channel with a receiving antenna is shown instead of multiple receive channels. FIG. 3 shows corresponding method steps.

An encoding of transmitted signals takes place in step S10. As shown in FIG. 1, for all transmitting antennas 10, sequences of identical signals 12 in the form of frequency ramps are generated by an HF oscillator 14 that is controlled by a frequency modulation device 16. In each of the multiple transmission channels, a particular phase modulator 18 that is connected upstream from an amplifier 19 modulates the phases of signals 12 according to a particular code 20 that is generated by a code generator 22. The phase-modulated signal is emitted via a transmitting antenna 10 of the transmission channel.

A "fast chirp" frequency modulation scheme that includes a sequence of relatively "fast" frequency ramps is used, so that the evaluations of distance d and speed v can take place essentially independently of each other, for example using a two-dimensional Fourier transform. In particular, the Doppler shift within a ramp can be disregarded.

FIG. 1 shows a combination of codes 20 of the individual transmitting antennas 10 to form a code block 26. Code block 26 associates a code value A, B, C, . . . of particular code 20 with each individual signal 12 of a transmitting antenna 10. The individual code value defines a phase with which phase modulator 18 modulates the signal. At each code point in time, also referred to as code instance I, i.e., at each position within code 20, code block 26 thus defines a particular code value for each of transmitting antennas 10. The number of codes 20 of a code block 26 corresponds to the number of transmitting antennas that transmit simultaneously. In the sequence of code instances I, where I=1, . . . , m, for each transmitting antenna 10 the phase modulation runs through the code values of the particular code. As shown in FIG. 1, the code blocks are identically repeated. Codes 20 of a code block 26 are mutually orthogonal. The signals of individual transmitting antennas 10 are thus encoded by the codes; the transmitted signals are mutually orthogonal to allow a signal separation in the receive channel.

After reflection of transmitted signals 12 on a radar object 28, in each receive channel, signal 32 received from particular receiving antenna 30 is mixed with the nonphase-modulated signal of HF oscillator 14 in a mixer 34 and brought into a low-frequency range. An A/D conversion by an A/D converter 36 then takes place in the customary manner.

The received signal contains time-shifted, and in the case of a relatively moved radar object 28, also frequency-shifted, superimposed reflections of transmitted phase-modulated signals 12. Received signals 32 corresponding to the different code instances I are separated in a demultiplexer 38. For each code instance I, a computation of a 2D FFT 40 then takes place (step S20) via a Fourier transform in a first dimension over the course of individual signal 12, and in a second dimension over the sequence of successive code blocks 26.

The obtained 2D spectrum corresponds to a distance-speed space in which detected radar objects occur as a complex amplitude of the spectrum. Due to time interval $T_{C2C}$ between successive identical code instances, i.e., between identical positions in successive code blocks, the speed is determined only within a uniqueness range. The uniqueness range, i.e., width $v_u$ of the uniqueness range, is determined by repetition rate $1/T_{C2C}$ of the code blocks.

In an obtained complex 2D spectrum, an object detection device 42 carries out a detection (step S21) of radar objects 28 based on peaks of the spectrum, i.e., based on the position of maxima at the distance and speed positions in question. The detection can take place, for example, based on non-coherent integration, such as a summation of the absolute values, of the complex 2D spectra of the individual code instances. Via this noncoherent integration, information from the partial measurements can be combined corresponding to the code instances, thus improving the detection.

For a detected radar object 28, based on the position of the particular peak in the (integrated) two-dimensional spectrum a speed estimator 43 computes an estimated value of distance d of the radar object, corresponding to a distance estimation (step S22), and computes an estimated value of periodically ambiguous speed $v_{amb}$, corresponding to an estimation of the Doppler shift of the signals (step S24). The radar system is designed for a speed measuring range that exceeds width $v_u$ of the uniqueness range, and which can be, for example, a multiple width $v_u$ of the uniqueness range. Actual speed v of the radar object within the speed measuring range for which the radar system is designed can be equal to $v_{amb}$, or can differ from $v_{amb}$ by an integer multiple of $v_u$, corresponding, for example, to one of the values $v_{amb}-v_u$, $v_{amb}$, $v_{amb} v_u$, $v_{amb}+2 v_u$.

Based on ambiguous speed estimation $v_{amb}$, further processing of the signals now takes place in different processing branches 44 for different ambiguity hypotheses, in each case assuming a Doppler shift corresponding to the "actual" speed of radar object 28 that results for the particular ambiguity hypothesis.

Based on the particular assumed ambiguity hypothesis for speed estimation $v_{amb}$, i.e., for the particular hypothetical "actual" speed of radar object 28, a Doppler compensation device 46 carries out a computation of Doppler shift-compensated signals for the particular signals of code instances I (step S30). For this purpose, for the complex amplitude of the peak in the particular 2D spectrum corresponding to radar object 28, a phase compensation corresponding to a compensation for the Doppler shift of the phase that is expected for the particular code instance is carried out. Thus, a corresponding Doppler shift of the phase that is expected for the hypothetical speed is compensated for, depending on the position of the code instance in the transmitted signal sequence.

The Doppler shift-compensated signals of the code instances are decoded by a decoder 48 (step S32) by multiplying the signal vector by a decoding matrix. The result of the decoding is a vector of the signal components associated with the different transmitting antennas 10.

The signal components are supplied to an angle estimator 50, which delivers a result of an angle estimation as well as the quality of the angle estimation (step S34) in a manner known per se, by comparison with signal values that are expected for particular angles. For example, an angle spectrum is obtained in which the height of a peak for an angle corresponds to the quality of the estimation of this angle as an applicable direction angle of the radar object.

The results of the particular angle estimations and the associated qualities of the angle estimations are thus obtained in processing branches 44. Steps S30 through S34 are thus carried out in each case for the particular ambiguity hypotheses.

A selection device 52 selects from the results of the angle estimations the angle estimation having the highest quality (step S36). The corresponding ambiguity hypothesis is then determined as applicable, and an unambiguous estimated value for relative speed v of radar object 28 within the speed measuring range for which the radar system is designed is determined (step S38).

A distance estimation, an angle estimation, and an unambiguous speed estimation are thus obtained for radar object 28. Steps S22 through S38 are carried out for each detected radar object 28, since a separate Doppler estimation is to be carried out for each radar object.

The extent of the effect of the Doppler shift on the decoding of the received signals can be controlled in a targeted manner by changing in a targeted manner the intervals and/or sequences of the points in time at which the particular code instances are transmitted.

In the above example, the code instances of an individual code block 26 are directly used in succession for the phase modulation of particular signals 12 of transmitting antennas 10.

Figure 4:
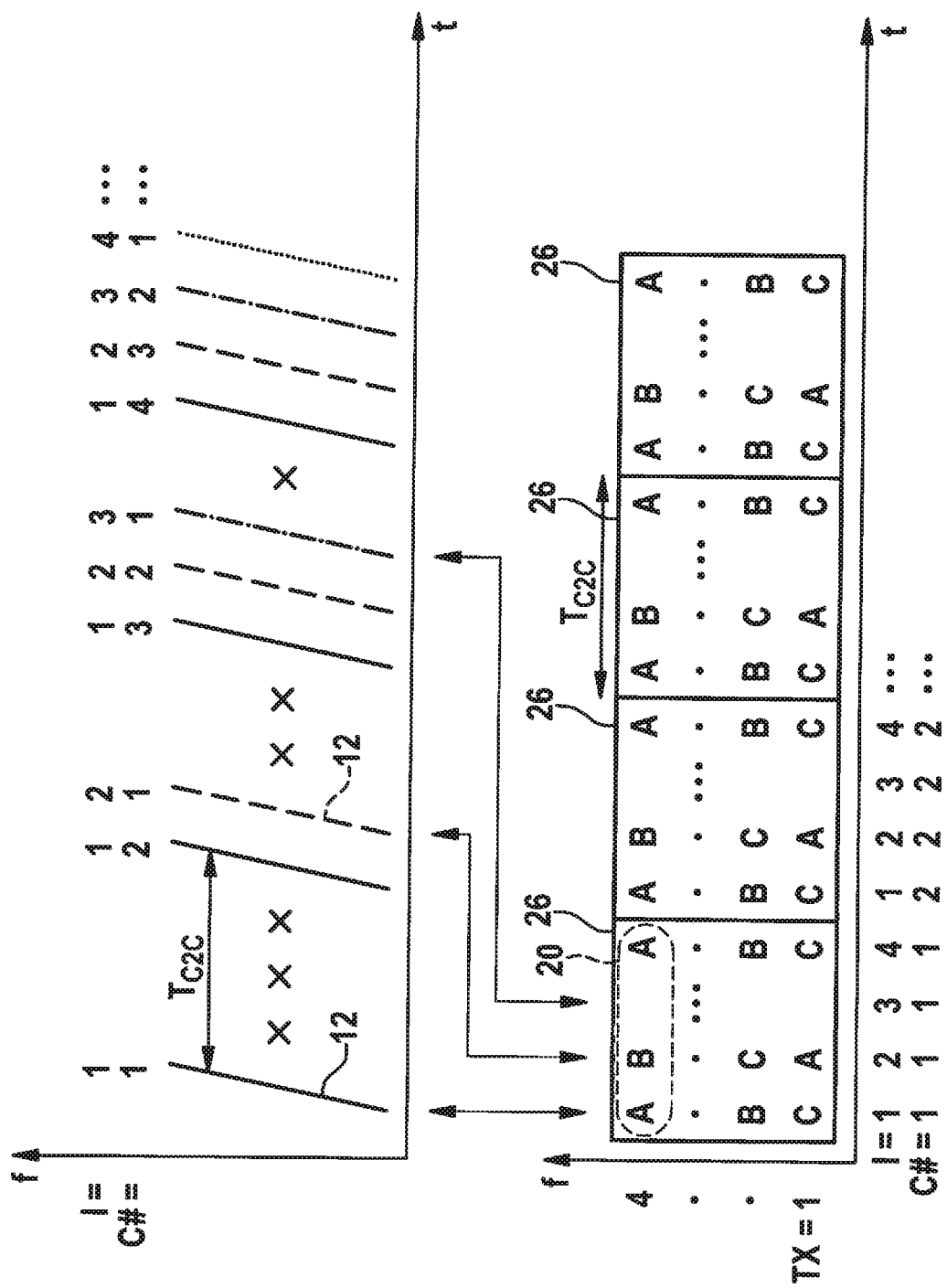
FIG. 4 shows an example embodiment of a temporally extended placement of the code instances of the transmission signals, according to an example embodiment of the present invention.

FIG. 4 shows a variant in which the code instances of an individual code block 26 are not directly used in succession for the phase modulation of signals 12 of transmitting antennas 10. In the variant, after use of a code instance I=1 of a code block 26, the use of another code instance I=2 of code block 26 does not take place until a particular additional delay of a time interval that corresponds to time $T_{C2C}$ from code block to code block. A multiple of this time interval can also be used as a delay. In FIG. 4, code instances I are numbered, and the successive code blocks are numbered as C #. The effect of the Doppler shift on the received signals that belong to a code block is thus increased.

Codes should preferably be selected whose cross-correlations are preferably irregular for different Doppler shifts. The situation can thus be avoided that large side lobes corresponding to the cross-correlations are obtained in the angle spectrum for different ambiguity hypotheses. The separation of object detections is thus simplified.

Figure 5:
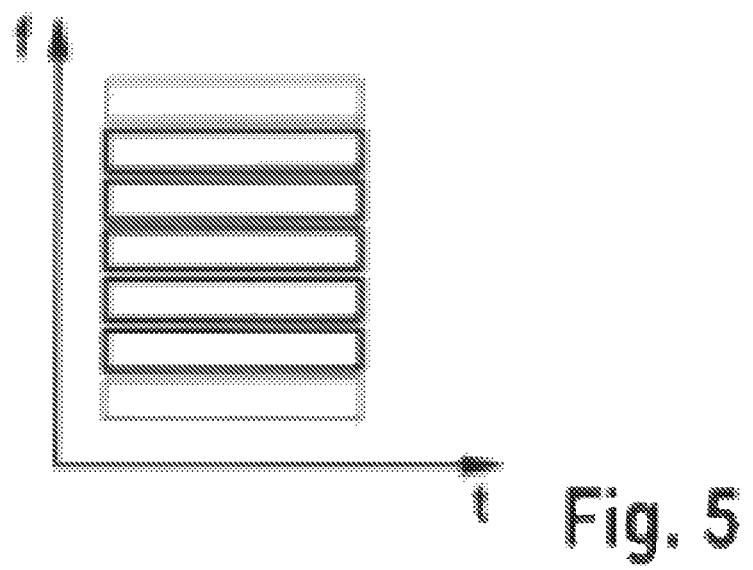
FIG. 5 shows a schematic diagram of the frequencies of an OFDM transmission signal, according to an example embodiment of the present invention.
Figure 6:
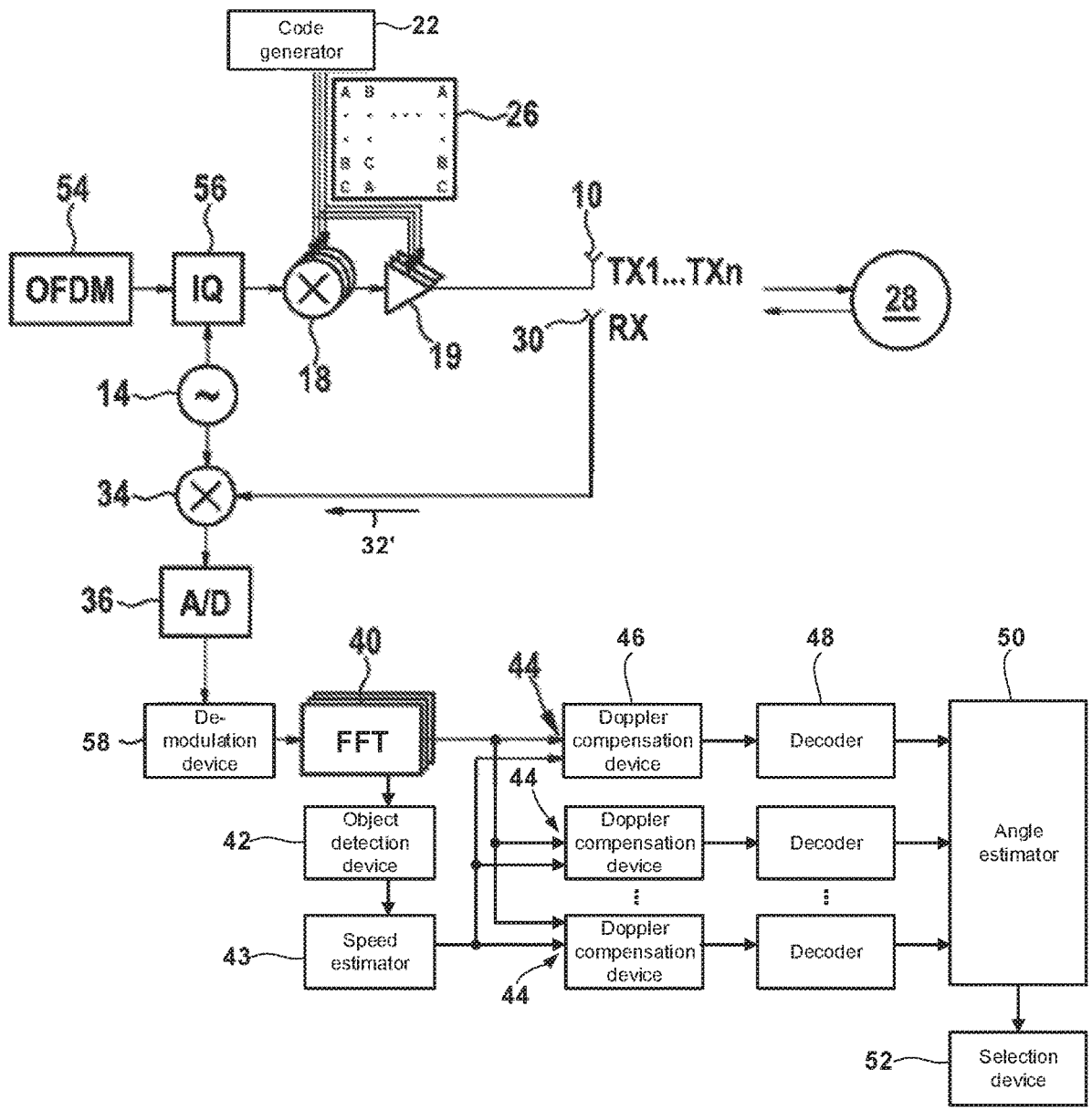
FIG. 6 shows a schematic illustration of another MIMO radar system with independent determinations of distance and speed, according to an example embodiment of the present invention.

FIG. 5 schematically shows an OFDM symbol with mutually orthogonal data at particular subcarrier frequencies, and FIG. 6, corresponding to FIG. 2, schematically shows an example embodiment of an OFDM MIMO radar system in which signals 12' are OFDM symbols. Identical or mutually corresponding elements or signals are denoted by the same reference numerals.

An OFDM generation device 54 generates digital OFDM symbols that are converted into an analog signal by inverse fast Fourier transform (IFFT) and D/A conversion, and modulated to an HF carrier signal of HF oscillator 34 in an IQ mixer 56.

Phase modulator 18 encodes the signal for each transmitting antenna 10 according to codes 20 of code blocks 26, using phase modulation. Alternatively, the encoding can also take place at another location in the signal path, for example upstream from IQ mixer 56, or digitally at the OFDM symbols (upstream from the D/A conversion). The encoded signals are emitted via transmitting antennas 10, as in the example in FIG. 2.

Received signal 32' contains a sum of OFDM symbols that are delayed due to the signal propagation time and Doppler-shifted due to the relative speed of radar objects 28.

A demodulation device 58 determines a distance spectrum and carries out a distance estimation at the received signals of a particular code instance that are downmixed with the signal of HF oscillator 14 at mixer 34 and digitized by A/D converter 36. A separation of received signals 32' that correspond to the different code instances I thus takes place. The distance spectrum is determined using matched filtering, or using FFT, spectral division for normalizing the amplitudes of the subcarrier signals, and inverse fast Fourier transform (IFFT). An FFT 60 is carried out over the sequence of the OFDM symbols thus demodulated, i.e., over the sequence of successive code blocks 26, in order to obtain an ambiguous speed spectrum in the particular dimension. The evaluation of the obtained two-dimensional distance-speed spectrum with ambiguity of the speed is then carried out by object detection device 42 corresponding to the example in FIGS. 2 and 3, and the further processing in processing branches 44 for the particular ambiguity hypotheses is carried out.

A phase modulation of signals 12 takes place in the above example embodiments. The example embodiments can be varied in that an amplitude modulation takes place during the encoding of transmitted signals 12 by a particular amplitude modulator, for example in the form of amplifier 19, it being possible for the amplitude modulation to take place in addition or as an alternative to the phase modulation by particular phase modulator 18.

In an example embodiment, it can be provided that the particular transmitting antennas 10 do not transmit simultaneously within a code block 26, and instead, at each code instance I only one particular transmitting antenna of transmitting antennas 10 is active, while the respective other transmitting antennas 10 are muted by a corresponding code value. This code value thus corresponds to an amplitude modulation with an amplitude of zero for particular signal 12.

For example, for a transmission sequence of four transmitting antennas TX0, TX3, TX2, TX1, the Doppler compensation for a non-applicable hypothesis concerning the ambiguous value of the speed can result in incorrect phases of the signal components associated with the individual transmitting antennas in a manner as described above, so that the quality of the angle estimation represents a quality criterion for the decoding.

What is claimed is:

1. A method for operating a MIMO radar system, the method comprising:
    encoding signals that are transmitted from transmitting antennas of the MIMO radar system according to code blocks, wherein the code blocks each includes respective codes encoding respective sequences of the signals that are of respective ones of the transmitting antennas, the codes each including a respective sequence of code values according to which a phase and/or an amplitude of the respective sequence of signals of the respective transmitting antenna is modulated;
    determining a Doppler estimation for a radar object based on phase changes between received signals at a same position in successive code blocks, the Doppler estimation for the radar object having a periodic ambiguity corresponding to multiple ambiguity hypotheses of a Doppler shift of the signals; and
    resolving the periodic ambiguity of the Doppler estimation for the radar object for the multiple ambiguity hypotheses of the Doppler shift, wherein the resolving includes:
        for each of the multiple ambiguity hypotheses of the Doppler shift:
            compensating for a Doppler shift of phases of the signals belonging to a code block according to the respective ambiguity hypothesis;
            decoding the Doppler shift-compensated signals of the code block to separate signal components associated with the transmitting antennas; and
            determining a quality criterion of the decoding;
        selecting one of the ambiguity hypothesis that is applicable to the radar object based on the determined quality criteria for the decoding for the respective ambiguity hypotheses; and
        determining an unambiguous speed estimation of the radar object corresponding to the Doppler estimation and the selected ambiguity hypothesis.

2. The method of claim 1, wherein:
    the determining the quality criterion of the decoding includes determining angle estimations for the radar object, based on the signal components and their association with the transmitting antennas, the quality criterion includes a quality of the angle estimation; and
    the resolving of the periodic ambiguity of the Doppler estimation for the radar object further includes selecting one of the angle estimations, which corresponds to the selected ambiguity hypothesis.

3. The method of claim 1, wherein the encoded signals include signals that are simultaneously transmitted from different ones of the transmitting antennas according to the code blocks, each of one or more of the code blocks including a plurality of codes for encoding the simultaneously transmitted signals of the different ones of the transmitting antennas.

4. The method of claim 1, further comprising:
    determining a distance estimation for the radar object based on an evaluation of a propagation time of one of the received signals.

5. The method of claim 4, wherein, in the step of encoding, an individual one of the signals of one of the transmitting antennas, which is phase-modulated and/or amplitude-modulated according to a corresponding one of the code values, has a bandwidth that limits a distance resolution of the distance estimation in the step of determining the distance estimation.

6. The method of claim 1, wherein the determining of the Doppler estimation is based on the signals prior to the step of decoding.

7. The method of claim 1, wherein the decoding takes place via matrix multiplication.

8. The method of claim 1, wherein, in the step of encoding, an individual one of the signals of one of the transmitting antennas is a frequency-modulated signal in the form of a ramp and is phase-modulated and/or amplitude-modulated according to a corresponding one of the code values that is associated with the respective signal based on a position of the respective code value in the sequence of the code values.

9. The method of claim 1, wherein, in the step of encoding, an individual one of the signals of one of the transmitting antennas is an OFDM symbol that is phase-modulated and/or amplitude-modulated according to a corresponding one of the code values that is associated with the respective signal based on a position of the respective code value in the sequence of the code values.

10. A MIMO radar system for estimating a speed of detected radar object, the system comprising:
a plurality of transmitting antennas; and
a control device;
wherein the control device is configured to:
encode signals that are transmitted from the transmitting antennas according to code blocks, wherein the code blocks each includes respective codes encoding respective sequences of the signals that are of respective ones of the transmitting antennas, the codes each including a respective sequence of code values according to which a phase and/or an amplitude of the respective sequence of signals of the respective transmitting antenna is modulated;
determine a Doppler estimation for a radar object based on phase changes between received signals at a same position in successive code blocks, the Doppler estimation for the radar object having a periodic ambiguity corresponding to multiple ambiguity hypotheses of a Doppler shift of the signals; and
resolve the periodic ambiguity of the Doppler estimation for the radar object for the multiple ambiguity hypotheses of the Doppler shift, wherein the resolving includes:
for each of the multiple ambiguity hypotheses of the Doppler shift:
compensate for a Doppler shift of phases of the signals belonging to a code block according to the respective ambiguity hypothesis;
decode the Doppler shift-compensated signals of the code block to separate signal components associated with the transmitting antennas; and
determine a quality criterion of the decoding;
select one of the ambiguity hypothesis that is applicable to the radar object based on the determined quality criteria for the decoding for the respective ambiguity hypotheses; and
determine an unambiguous speed estimation of the radar object corresponding to the Doppler estimation and the selected ambiguity hypothesis.

* * * * *